June 17, 1930. C. ANDERSON 1,763,636
DEVICE FOR MEASURING THE LOAD ON VEHICLES
Filed Dec. 16, 1927
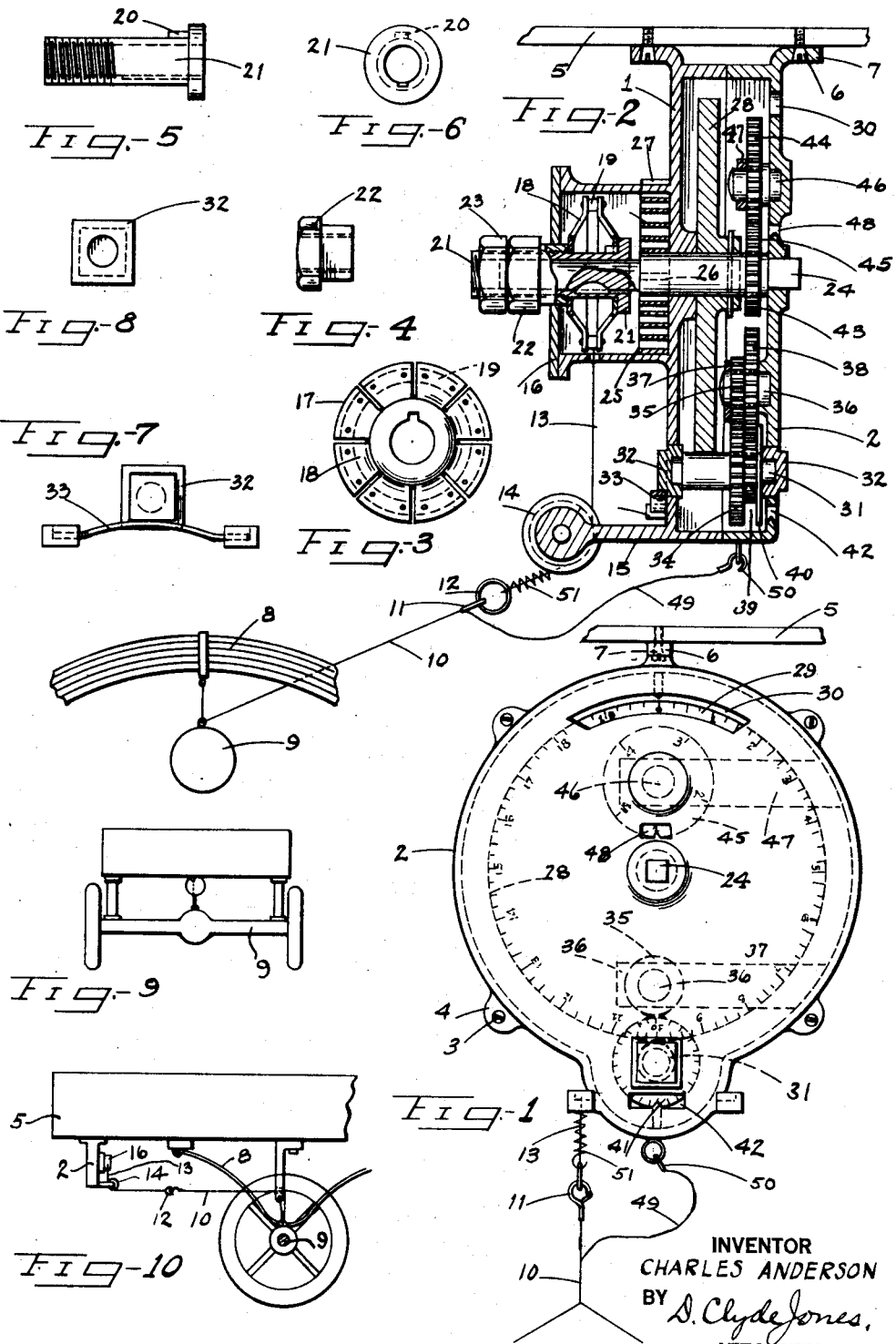
INVENTOR
CHARLES ANDERSON
BY D. Clyde Jones,
ATTORNEY Patented June 17, 1930

1,763,636

UNITED STATES PATENT OFFICE

CHARLES ANDERSON, OF ROCHESTER, NEW YORK

DEVICE FOR MEASURING THE LOAD ON VEHICLES

Application filed December 16, 1927, Serial No. 240,437, and in Great Britain January 26, 1927.

This invention relates to weighing devices and in its broader aspect includes means co-operating with the floor of a vehicle to measure the weight of the load supported thereby.

In the specific embodiment herein disclosed the means for measuring the load on a vehicle consists of a registering device including a spring-urged drum within a casing mounted on a vehicle and a flexible transmission element such as a cord, wire or the like having one end wound on the drum from which said element extends through an eye in the vehicle axle to an anchorage point presented by a load-sustaining spring, the spring which acts on the drum tending to turn the drum in the direction to maintain the transmission element taut, the arrangement being such that depression of the load-sustaining spring in reducing the distance between the said spring and the axle permits the drum to be turned by its spring in the direction to pay in the cord, wire or the like, the extent of turning movement of the drum as registered being a measure of the load.

Desirably, the device includes a set of dials, namely, a dial co-axial with the drum which may serve to register hundred weights and quarters, a second dial driven through a train including a roller spring-urged against the periphery of a disc bearing the first dial, said second dial being arranged, for example, to register pounds, and a third dial operated by a train from a spindle carrying the first drum, and serving to register tons.

The flexible transmission element has preferably a point of break presented by a swivel or the like by disengagement of which the device may be rendered inoperative, a branch lead being led from a point of said element near said point of break to an anchorage point presented by the casing. A helical spring with the inner periphery of which the element makes contact serves to absorb shock when the swivel is disengaged.

Desirably, the drum is so arranged as to be expansible or contractible to correspond with the range of movement of the springs of the particular vehicle of which the load is to be measured.

In order that my said invention and the manner of carrying it into effect or practice may be properly understood I have hereunto appended one sheet of explanatory drawings in which:—

Figure 1 is a front elevation of a device constructed in accordance with this invention for measuring the load on a vehicle.

Figure 2 is a section of the said device taken on a plane at right angles to Figure 1.

Figures 3 to 10 are detail and schematic views to which reference will be made hereinafter more particularly.

Referring to these drawings:—

In carrying this invention into effect or practice a casing preferably formed in sections 1 and 2 united by screws 3 which pass through lugs 4, is secured to the body 5 of the vehicle by screws 6 which pass through lugs 7. A wire 10 secured to the spring 8 of the vehicle passes through an eye on the axle 9 of the vehicle and is provided with a swivel 11 connected by a link 12 to a second wire 13 which passes around a guide pulley 14 carried by an arm 15 projecting from the section 1 of the casing. The wire 13 passes from the pulley 14 through the wall of a housing 16 carried by the section 1 of the casing and around an expanding drum 17 to which it is secured. The drum 17, shown in detail in Figure 3, consists of spring steel walls or discs having their inner or adjacent faces of dished or concave formation and their outer faces of convex formation. These walls or discs are formed with slots which extend inwards radially from their peripheries so as to divide the outer radial portions of the discs into segments or sections 18. The sections 18 of the one disc are secured to the opposite sections of the other disc by means of sections or segments 19. The drum 17 is mounted on a sleeve 21. Rotation of the drum 17 on the sleeve 21 is prevented by means of a feather or key 20. The sleeve 21 is provided with a nut 22 having a tubular extension and with a lock nut 23. A detail view of the nut 22 is shown by Figure 4 while Figures 5 and 6 are detail views of the sleeve 21. The extension of the nut 22 passes through the wall of the housing 16 and bears against one of the discs or walls of the drum 17. The drum 17 being an assembly of two radially slotted and centrally perforated heat treated spring steel walls or discs joined together by the peripheral segments 19, presents two members convexly opposed to each other so that when the nut 22 is screwed on the sleeve 21 in one direction or the other the diameter of the drum is increased or decreased.

The sleeve 21 is slidably but not rotatably mounted on a spindle 24 carried by the sections 1 and 2 of the casing and extending through the housing 16. A spiral spring 25 having its one end secured in a slot 26 in the spindle 24 and its other end secured in a slot 27 in the wall of the housing 16 is located within the housing 16. A disc 28 secured on the spindle 24 is provided with a graduated dial 29 which is visible through an aperture 30 formed in the section 2 of the casing. A roller 31 journalled in boxes 32 (Figures 7 and 8) is held in frictional engagement with the periphery of the disc 28 by means of springs 33 and is provided with a pinion 34 which engages another pinion 35 mounted on a spindle 36 carried by an arm 37 supported by the casing. The spindle 36 carries a pinion 38 which in turn revolves a pinion having a graduated dial 40 (around roller 31) associated with a pointer 41 to register pounds visible through an aperture 42 in the section 2 of the casing.

A pinion 43 secured on the spindle 24 engages a pinion 44 carried by a spindle 46 supported from the wall of the casing by means of an arm 47. The pinion 44 is provided with a graduated dial to register tons visible through an aperture 48 in the section 2 of the casing.

A branch lead 49 having a swivel 50 extends to an eye or the like on the casing for conveniently putting the device into inoperative position while a helical spring 51 may be provided to absorb shock following release of the swivel 11.

By means of the expanding and contracting drum 17 the device is effective through a greater range of vehicle springs. The object of the expanding and contracting control drum 17 is to compensate the device for changes in the condition of the vehicle springs to which it may be attached. The degree to which the springs of the vehicle have weakened will be shown by the failure of the dials to return "zero" at the pointers. This may be corrected by advancing or retarding the nut 22 and lock nut 23 on the sleeve 21 thereby increasing or decreasing the circumference of the controlling drum until the dials return "zero" when the device will work in proportion to the deflection of the springs by a given load. The force exerted by the drum walls 18 is distributed circumferentially and is restrained by the sections 19 in accordance with the adjustment of the nut 22 locked by nut 23, thereby increasing or decreasing the diameter and circumference of the controlling drum as the occasion demands. The drum walls always exert a force circumferentially greater than the force exerted by the wire 13 in driving the dials. It is possible to allow a percentage of adjustment on the drum without materially affecting the accuracy of the device. In the event of the vehicle springs weakening beyond the range of a drum they would come within range of the next standard drum.

It will be noted that the sleeve 21 is slidably mounted on the spindle 24 to prevent wire 13 gaining an angle between drum 17 and pulley 14 and that the periphery of the drum 17 is provided with a lead to accommodate the wire 13.

In the modified arrangement shown in Figs. 9 and 10 the device is mounted on the body or floor 5 of the vehicle midway between the ends of the axle 9. As in the previous modification the wire 13 passes through the pulley 14 and then continues with its branch 10 through an opening in the bracket 16 secured to the floor 5 directly above the middle point of the axle. Wire 10 then extends through an eyelet in the axle directly beneath the opening of the bracket after which it is anchored on the bracket or any suitable place on the floor 5 so that its two vertical portions may be substantially parallel.

A similar device may be used for registering the load on the front axle and may be suitably mounted on the dashboard of the vehicle. If desired, one device may be mounted on the front of the truck and another on the rear.

It will thus be seen that a simple device is provided which indicates at all times the load carried by the vehicle.

What I claim, is:

1. In combination with a vehicle having a wheel-supported member, a spring structure mounted on said member and a floor supported on said spring structure, a weight-measuring device including a series of indicators for indicating the component parts of the weight to be indicated, said weight-measuring device being mounted on the vehicle and being actuated by the relative movement of said member and said floor, and adjustable compensating means to compensate for variations in said spring structure.

2. In combination with a vehicle having a wheel-supported member, a spring structure mounted on said member and a floor supported on said spring structure, a weight-measuring device mounted on the vehicle to measure the relative movement between said floor and said member, said weight-measuring device including a rotatable shaft, means tending to rotate said shaft in one direction, a weight indicator driven from said shaft, a flexible connection for rotating said shaft in a direction opposite to said means, said flexible connection having one end fixed to said shaft with an intermediate portion slidably connected to said member and having its other end connected to said floor, and adjustable compensating means associated with said measuring device to compensate for variations in said spring structure.

3. In combination with a vehicle having a wheel-supported member, a spring structure mounted on said member and a floor supported on said spring structure, a weight-measuring device mounted on the floor including a rotatable shaft, a spring tending to rotate said shaft in one direction, a series of indicators driven from said shaft, a flexible connection for moving said shaft in the opposite direction, said flexible connection including a point on said shaft, a slidable connection on said member and a fixed point on said floor, and adjustable compensating means cooperating with said flexible connection to compensate for variations in said spring structure.

4. In combination with a vehicle having a wheel-supported member, and a floor resiliently supported on said member, a weight-measuring device mounted on said floor, said weight-measuring device including a casing, a rotatable shaft mounted in journals in said casing, a disc provided with weight indicia carried by said shaft, a pinion secured to said shaft, a second pinion carrying indicia mounted in said casing to be driven from said first pinion, a spring tending to rotate said shaft, a flexible connection to said shaft for rotating it against the action of said spring, said flexible connection passing through an opening on said member to a fixed point on said floor, and adjustable compensating means associated with said weight-measuring device and cooperating with said flexible connection to compensate for variations in the relation between said wheel supported member and said floor.

5. In combination with a vehicle having a wheel-supported member, and a floor member resiliently supported on said first member, a weight-measuring device mounted on one of said members, said weight measuring device including a spring actuated rotatable shaft bearing weight indicating means, a drum adjustable as to its circumference mounted on said shaft, a flexible connection extending from a point on said drum around said drum to a fixed point on said floor through a slidable connection on said member.

6. In combination with a vehicle having an axle, springs mounted on said axle, and a floor supported on said springs, a weight-measuring device including a spring actuated rotatable shaft bearing weight-indicating means, an adjustable drum mounted on said shaft, said drum including two concave resilient discs notched radially and joined together at points spaced about their peripheries, means for varying the distance between said discs to vary the circumference of said drum, and a flexible connection to said drum extending around said drum through an eyelet on said axle to a fixed point on said floor.

7. In combination with a vehicle having an axle, springs mounted on said axle and a floor supported on said springs, a weight-measuring device including a spring actuated rotatable shaft bearing weight-indicating means, an adjustable drum slidably mounted on said shaft, said drum including two concave resilient discs notched radially and joined at points spaced about their peripheries, a threaded sleeve passing through said discs and provided at one of its ends with a shoulder engaging one of said discs and a nut on said threaded portion engaging the other disc for varying the distance between said discs to vary the circumference of said drum, and a flexible connection to said drum extending around said drum and through an eyelet on said axle to a fixed point on said floor.

8. In combination with a vehicle having a wheel-supported member and a floor resiliently supported on said member, a weight-measuring device mounted on said floor, said weight-measuring device including a casing, a rotatable shaft mounted in journals in said casing, a disc provided with weight indicia carried by said shaft, a pinion secured to said shaft, a second pinion carrying indicia mounted on said casing to be driven from said first pinion, a roller rotatably mounted in said casing for frictional engagement with the periphery of said disc, indicating means driven from said roller and means for driving said first shaft in accordance with the relative movement between said member and said floor.

9. In combination with a vehicle having a wheel-supported member, and a floor member resiliently supported on said first member, a weight-measuring device mounted on one of said members, said weight-measuring device including a spring actuated rotatable shaft bearing weight indicating means, a drum adjustable as to its circumference mounted on said shaft, and a flexible connection extending from a point on said drum around said drum to the other of said members.

In witness whereof, I hereunto subscribe my name this 13th day of December A. D. 1927.

CHARLES ANDERSON.